(12) United States Patent
Fukushima

(10) Patent No.: US 8,213,048 B2
(45) Date of Patent: Jul. 3, 2012

(54) INFORMATION DISPLAY APPARATUS, INFORMATION DISPLAY METHOD AND INFORMATION DISPLAY PROGRAM

(75) Inventor: Naoto Fukushima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 930 days.

(21) Appl. No.: 12/288,054

(22) Filed: Oct. 16, 2008

(65) Prior Publication Data

US 2009/0103134 A1    Apr. 23, 2009

(30) Foreign Application Priority Data

Oct. 17, 2007   (JP) ................................. 2007-270408

(51) Int. Cl.
*G06F 15/00* (2006.01)
*G09G 5/00* (2006.01)

(52) U.S. Cl. ......... 358/1.6; 358/1.9; 358/1.15; 345/156; 345/173; 345/179

(58) Field of Classification Search .................. None
See application file for complete search history.

(56) References Cited

U.S. PATENT DOCUMENTS

| | | | |
|---|---|---|---|
| 5,790,114 A * | 8/1998 | Geaghan et al. ............. 715/763 |
| 5,838,819 A | 11/1998 | Ruedisueli et al. | |
| 6,424,738 B1 | 7/2002 | Katsumura et al. | |
| 6,724,373 B1 * | 4/2004 | O'Neill et al. ................ 345/179 |
| 2002/0008692 A1 * | 1/2002 | Omura et al. .................. 345/173 |
| 2006/0090161 A1 * | 4/2006 | Bodas et al. ................... 718/100 |
| 2007/0057923 A1 | 3/2007 | Kitazaki | |
| 2007/0285687 A1 * | 12/2007 | Okuyama ....................... 358/1.9 |

FOREIGN PATENT DOCUMENTS

| | | | |
|---|---|---|---|
| CN | 1208483 A | | 2/1999 |
| JP | 08088708 A | * | 4/1996 |
| JP | 9-295430 A | | 11/1997 |
| JP | 2000-056747 A | | 2/2000 |
| JP | 2003-177908 A | | 6/2003 |
| JP | 2007-080076 A | | 3/2007 |

* cited by examiner

*Primary Examiner* — Marivelisse Santiago Cordero
*Assistant Examiner* — Huo Long Chen
(74) *Attorney, Agent, or Firm* — Edwards Wildman Palmer LLP; David G. Conlin; David A. Tucker

(57) ABSTRACT

An information display apparatus includes a touch panel, and a storage/management unit for storing objects input from the touch panel and other information. The storage/management unit includes a memory space (22) for temporarily storing a display object among the input objects, a memory space (24) for temporarily storing a print object, and a memory space (20) for temporarily storing other information (28). In the information display apparatus, at the time of printing, objects (30, 32) to be printed can be selected from input objects (30, 32, 34, 36), by designating a color of the object. The information display apparatus forms print information by combining pieces of information stored in memory spaces (20) and (24).

9 Claims, 12 Drawing Sheets

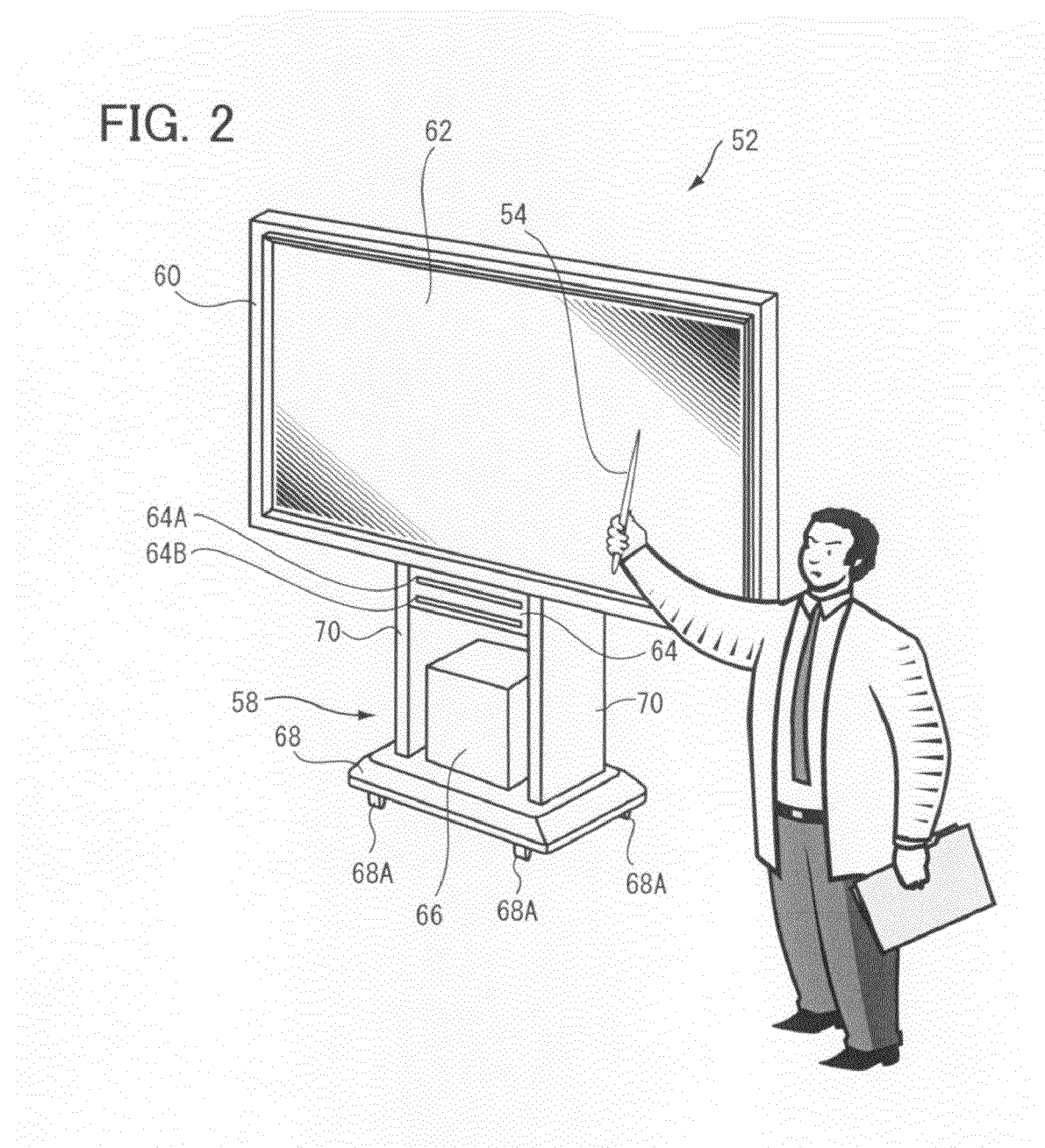

FIG. 5

| OBJECT NO. | DRAWING | WRITE-IN ORDER | COLOR | WRITE-IN TIME | DRAWING START POSITION | PRINT | POINTER |
|---|---|---|---|---|---|---|---|
| 0001 | ON | 1 | RED | 2007. 7. 5. 10:38:21 | (400, 500) | ON | 0x11…19F0 |
| 0002 | ON | 4 | RED | 2007. 7. 5. 10:39:00 | (320, 710) | ON | 0x11…22F3 |
| 0003 | ON | 11 | BLUE | 2007. 7. 5. 10:45:50 | (112, 332) | OFF | 0x11…29FA |
| 0004 | OFF | 2 | GREEN | 2007. 7. 5. 10:38:22 | (1000, 654) | OFF | 0x11…20F1 |
| 0005 | ON | 8 | BLACK | 2007. 7. 5. 10:40:09 | (10, 20) | OFF | 0x11…26F7 |
| : | : | : | : | : | : | : | : |

(table ref: 120)

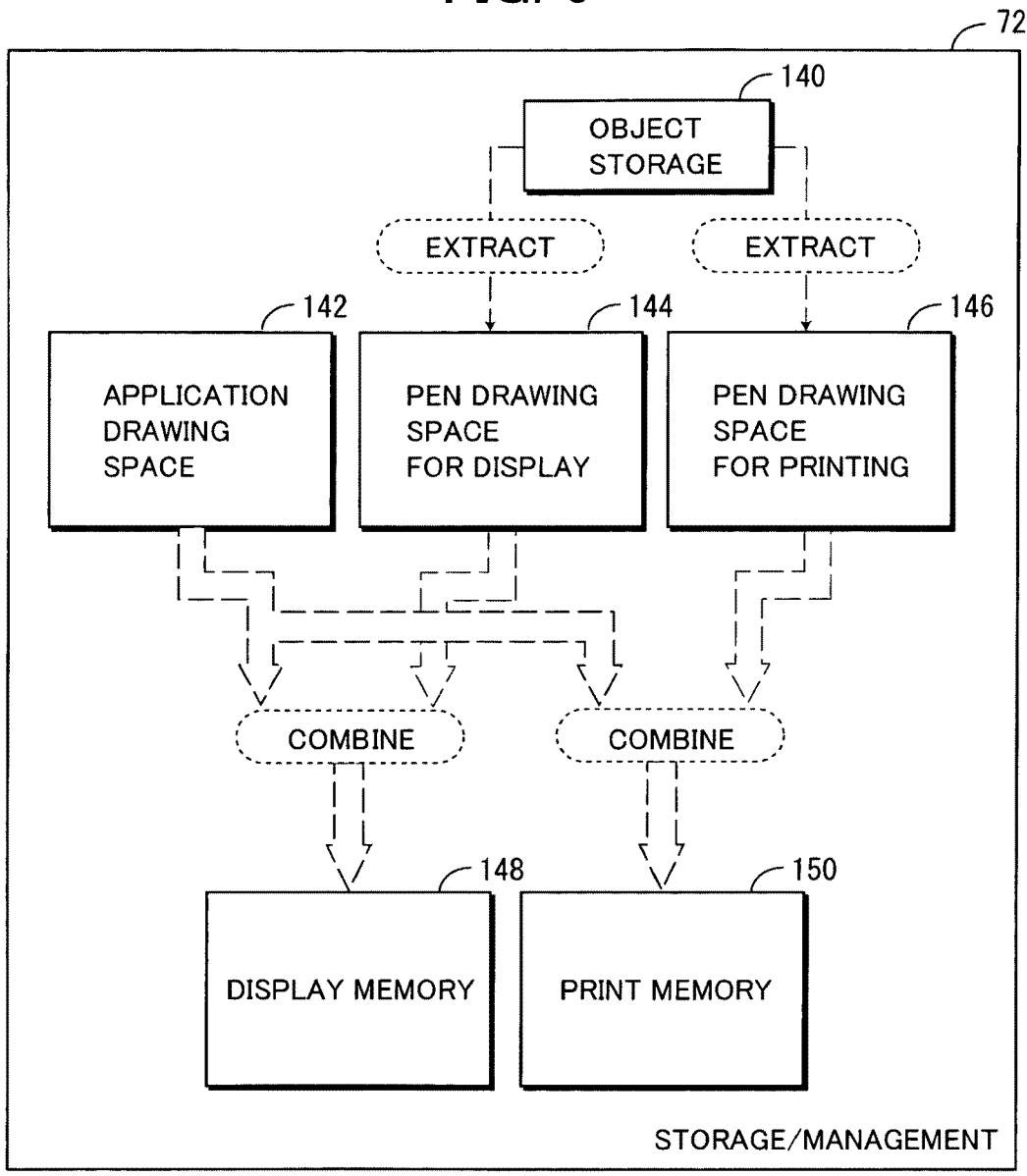

INFORMATION DISPLAY APPARATUS, INFORMATION DISPLAY METHOD AND INFORMATION DISPLAY PROGRAM

CROSS-REFERENCE TO RELATED APPLICATION

This nonprovisional application claims priority under 35 U.S.C. §119(a) on Patent Application No. 2007-270408 filed in Japan on Oct. 17, 2007, the entire contents of which are hereby incorporated by reference.

BACKGROUND OF THE INVENTION

1. Field of the Invention

The present invention relates to an information display apparatus provided with a touch panel and, more specifically, to a technique of printing information displayed on a display screen of the information display apparatus.

2. Description of the Background Art

A white board having an optical image sensor and a printer has been widely used for distributing minutes of a conference with many attendants. In the conventional white board, contents of proceedings written by a marker or the like are read by scanning with an optical image sensor. The optical image sensor obtains the contents of proceedings as an image. After the end of the conference, the organizer, for example, of the conference has only to print the image using a printer, prepare necessary number of copies of the print and to hand out the copies.

It is desired that a printer to be attached to the white board has a small size. As compared with a typical printer printing an image on plain paper, a thermal printer forming an image on a thermo-sensitive paper generally has a smaller size. Therefore, it is desired to have a small thermal printer mounted on the white board.

The method of printing an image described above, however, takes much time and labor, as a thermo-sensitive paper degrades quickly. The conference organizer, for example, must copy the printout sheet of thermo-sensitive by a copy machine or the like. Further, there has been much trouble for providing a clean copy of the minutes obtained as an image using word processor software or the like and for computerizing the information of the minutes for storage.

In order to solve these problems, Japanese Patent Laying-Open No. 2000-56747 discloses an electronic conference system in which a user directly writes-in contents of proceedings on a large display with an electronic pen, and all pieces of information written by the pen are computerized. In this system, the input information is computerized utilizing a technique such as OCR (Optical Character Recognition). By this system, it becomes possible for the conference organizer to easily manage, distribute to related parties, and to easily edit or process the contents of proceedings after the end of conference.

The technique disclosed in Japanese Patent Laying-Open No. 2000-56747, however, is silent about a method of classifying the input information in accordance with the usage. Each of the input contents of proceedings may have different level of importance. Further, it may be necessary to confirm who wrote what item of the contents of proceedings after the end of conference, if a plurality of participants had written items. There may be a demand for classifying input pieces of information into a number of groups in accordance with the level of importance, writer or the like, and for printing and saving information of a group selected by the user.

In consideration of such problems, Patent Application Publication US2007/0057923 A1 proposes a technique of distinguishing writers of pieces of information written-in to the white board from each other using a pen having a function of identifying each of the participants of a conference. The pen has a fingerprint sensor, and identifies a writer who holds the pen. Further, in the system according to this laid-open application, a sub-layer is formed by using a particular shape item, and thereby inputs made by one writer can further be distinguished for storage and management.

According to the technique of Patent Application Publication US2007/0057923 A1, however, what is possible is only the identification of writers. Therefore, it is impossible to extract and print only the pieces of information of higher importance among the input pieces of information regardless of the writer and to hand-out the printout to related parties.

In other words, there may be a demand that among the pieces of input information, those of lower importance may be displayed on the display during the conference but need not be printed. In such a case, it is necessary to extract only the pieces of information worth printing, from the pieces of information displayed on the display. Patent Application Publication US2007/0057923 A1, however, is silent about such a problem.

Further, if identification by the fingerprint sensor should fail, even the identification of a writer would be impossible.

SUMMARY OF THE INVENTION

Therefore, an object of the present invention is to realize an information display apparatus allowing printing of only the necessary information and avoiding printing of unnecessary information, among the input pieces of information.

Another object of the present invention is to provide a technique for extracting only the information that need be printed, from the pieces of displayed information.

A still further object of the present invention is to realize efficient printing of conference minutes by attaining the functions described above.

According to a first aspect, the present invention provides an information display apparatus, including: a display unit having a display screen; an input panel provided on the display screen; a first storage; a printer; a first storage controller coupled to the input panel and the first storage, for storing drawing data input to the input panel, together with a prescribed attribute value, in the first storage; a display controller coupled to the display unit, the input panel and the first storage, for displaying drawing data selected from the drawing data stored in the first storage, on the display screen; and a print controller coupled to the display unit, the input panel and the printer, for extracting, from the drawing data displayed on the display screen, data of which prescribed attribute value satisfies a prescribed condition designated by a user through an operation of the input panel, and causing the printer to print the extracted drawing data.

In the information display apparatus, the user inputs drawing data to be displayed on the display screen. The first storage controller stores a prescribed attribute value together with the drawing data. By the display controller, the drawing data selected by the user is displayed on the display screen. Among the displayed drawing data, one of which prescribed attribute value satisfies a prescribed condition designated by a user operation of an input panel is extracted and applied to the printer. Others are not extracted.

As the prescribed condition, a value may be set to extract only that one of the drawing data which is to be printed, and only the necessary drawing data can be printed. It is also possible to avoid printing of unnecessary data.

Preferably, the information display apparatus further includes: a second storage; and a second storage controller coupled to the second storage for storing drawing data formed by a drawing data source in the second storage. The print controller includes a unit coupled to the display unit, the input panel, the printer and the second storage, for extracting, from the drawing data displayed on the display screen, data of which prescribed attribute value satisfies a prescribed condition designated by a user through an operation of the input panel, combining the extracted data with drawing data stored in the second storage, and causing the printer to print the combined drawing data.

In the information display apparatus, the drawing data input to the input panel is stored in the first storage and the drawing data formed by the drawing data source is stored in the second storage, respectively. At the time of printing, the information display apparatus combines and prints that one of the drawing data stored in the first storage and displayed on the display screen which satisfies the prescribed condition, and the drawing data stored in the second storage.

The information display apparatus allows selection of necessary ones of the drawing data and printing of the selected data with other information. By way of example, assume that participants of a conference used the information display apparatus of the present invention, made discussions while displaying a certain piece of information on the display screen, and input and displayed data on a display area of an important portion of the information. When a participant prints and distributes the information and data after the end of the conference, it is possible to omit those of the data that need not be distributed.

Preferably, the prescribed attribute value includes a drawing color when the drawing data is displayed on the display screen. The print controller includes a unit coupled to the display unit, the input panel and the printer, for extracting, from the drawing data displayed on the display screen, data of which drawing color when displayed is the same as a color designated by the user by an operation of the input panel, and causing the printer to print the extracted drawing data.

The print controller compares, for each of the drawing data displayed on the display screen, the drawing color when it is displayed with the color designated by the user through an operation of the input panel. If the two colors are the same, the corresponding drawing data is extracted and printed. It is possible for the user to print only the necessary drawing data simply by designating the drawing color at the time of display of the drawing data.

Preferably, the print controller includes a unit coupled to the display unit, the input panel and the printer, for extracting, from the drawing data displayed on the display screen, data of which drawing color when displayed is the same as any of an arbitrary number of colors designated by the user by an operation of the input panel, and causing the printer to print the extracted drawing data.

Preferably, the prescribed attribute value includes the drawing color when the drawing data is displayed on the display screen. The print controller includes: an extracting unit, coupled to the display unit and the input panel, for extracting, from the drawing data displayed on the display screen, that one having the same color as designated by the user through an operation of the input panel; and a unit coupled to the extracting unit and the printer, for converting drawing color of the drawing data extracted by the extracting unit to a predetermined specific designated color, and causing the printer to print the drawing data.

The information display apparatus is capable of converting the color of drawing data to a color designated beforehand, and printing the same. Therefore, when drawing data that had to be displayed in different colors on the display screen but not in different colors for printing, it is possible for the user to have the drawing data in a single color. If the color of the drawing data is easily viewable on the display screen but not in print, it is possible for the user to change the color to an easily viewable color.

Preferably, the prescribed attribute value includes time when input of the drawing data was started by the input apparatus. The print controller includes a unit coupled to the display unit, the input panel and the printer, for extracting, from the drawing data displayed on the display screen, data of which input start time is within a time range designated by the user by an operation of the input panel, and causing the printer to print the extracted drawing data.

As the user designates the time when the input of drawing data was started, it is possible to have the information display apparatus to print only the necessary drawing data.

Preferably, the prescribed attribute value includes a coordinate position on the display screen where input of the drawing data was started by the input apparatus. The print controller includes a unit coupled to the display unit, the input panel and the printer, for extracting, from the drawing data displayed on the display screen, data of which coordinate position on the display screen where input was started is within a scope of coordinate positions designated by the user by an operation of the input panel, and causing the printer to print the extracted drawing data.

As the user designates the coordinate position on the display screen at which the input of drawing data started, it is possible to have the information display apparatus to print only the necessary drawing data.

Preferably, the prescribed attribute value includes an order of input of the drawing data by the input apparatus. The print controller includes a unit coupled to the display unit, the input panel and the printer, for extracting, from the drawing data displayed on the display screen, data of which order of input is within a range of order designated by the user by an operation of the input panel, and causing the printer to print the extracted drawing data.

As the user designates the order of input of the drawing data, it is possible to have the information display apparatus to print only the necessary drawing data.

According to a second aspect, the present invention provides an information display method, including: the input step of receiving an input of drawing data to be displayed on a display screen; the storing step of storing the drawing data input at the input step together with a prescribed attribute value, in a drawing data storage memory; the display control step of displaying, from the drawing data stored in the drawing data storage memory, drawing data selected by a user on the display screen; the designating step of designating a prescribed condition related to the prescribed attribute value; the data output step of extracting and outputting, from the drawing data displayed on the display screen, data of which prescribed attribute value satisfies the prescribed condition designated at the designating step; and the printing step of printing the drawing data output at the data output step.

Preferably, the prescribed attribute value includes a drawing color of the drawing data when displayed on the display screen. The designating step includes the drawing color designating step of designating any of drawing colors displayable on the display screen; and the data output step includes the step of extracting and outputting, from the drawing data displayed on the display screen, data of which drawing color when displayed is the same as a color designated at the drawing color designating step.

According to a third aspect, the present invention provides an information display program causing, when executed on a computer, the computer to execute an information display method including: the input step of receiving an input of drawing data to be displayed on a display screen; the storing step of storing the drawing data input at the input step together with a prescribed attribute value, in a drawing data storage memory; the display control step of displaying, from the drawing data stored in the drawing data storage memory, drawing data selected by a user on the display screen; the designating step of designating a prescribed condition related to the prescribed attribute value; the data output step of extracting and outputting, from the drawing data displayed on the display screen, data of which prescribed attribute value satisfies the prescribed condition designated at the designating step; and the printing step of printing the drawing data output at the data output step.

As described above, according to the information display apparatus of the present invention, it is possible for the user to select and print necessary data from drawing data input to and displayed on the display screen of the information display apparatus. The information display apparatus provides printout of the drawing data not including any unnecessary data and, therefore, it is possible to improve efficiency of the user's work.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view showing an appearance of an information display apparatus 52 in accordance with the first embodiment.

FIG. 5 shows an object management table 120.

FIG. 6 schematically shows memory spaces and mutual relation therebetween, included in the storage/management unit 72 shown in FIG. 2.

FIG. 7 shows pen software commands 170.

FIG. 8 shows sub-commands 180 of a print command shown in FIG. 7.

DESCRIPTION OF THE PREFERRED EMBODIMENTS

Figure 1A:
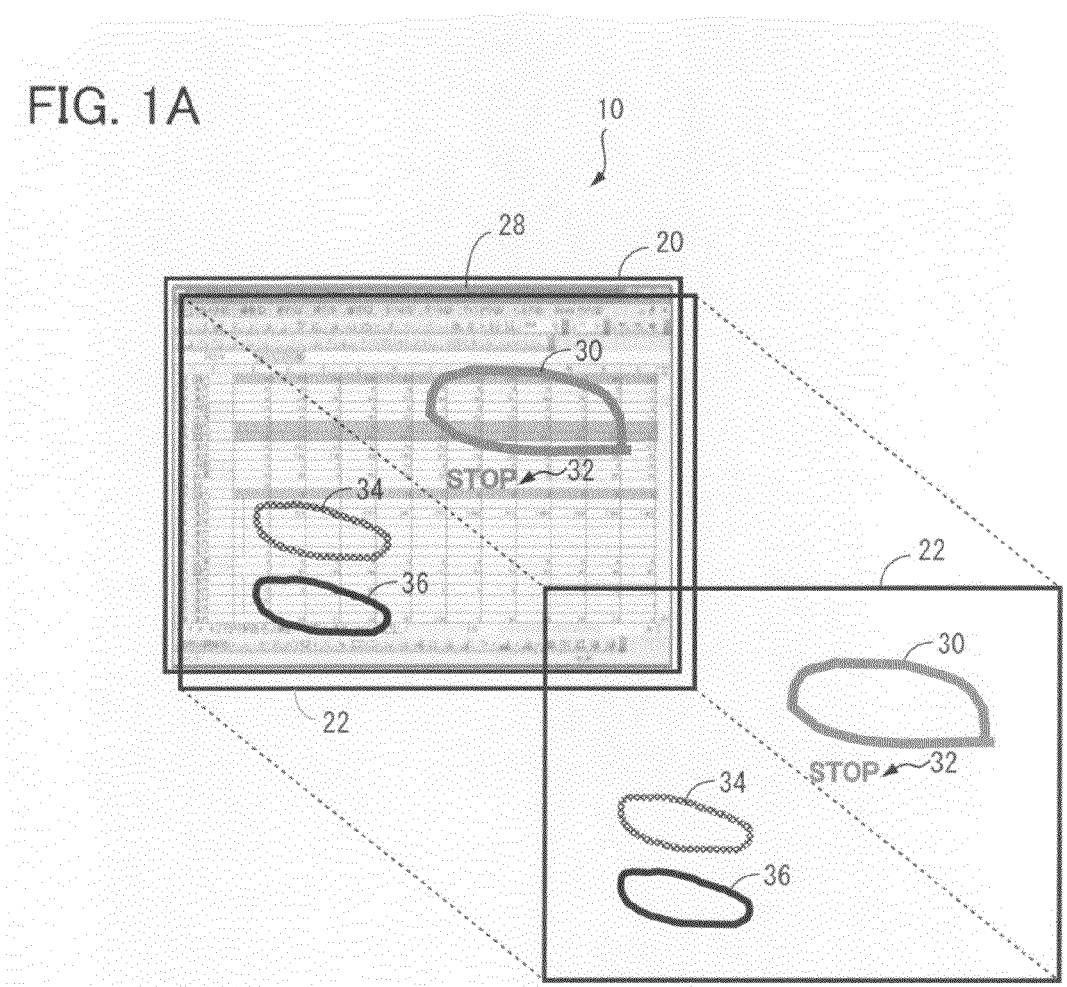
FIGS. 1A and 1B are schematic illustrations showing the manner of display and printing of the information display apparatus in accordance with the first embodiment of the present invention.

In the following, the information display apparatus in accordance with the embodiments of the present invention will be described. In the following description and in the drawings, the same components are denoted by the same reference characters and same names. Their functions are also the same. Therefore, detailed description thereof will not be repeated.

First Embodiment

Referring to FIG. 1A, in the first embodiment, information such as represented by image 10 of FIG. 1A is displayed on a display. Image 10 includes data 28 prepared by using general application software, and objects 30, 32, 34 and 36 input by the user for indicating parts of the data 28 during a conference.

In the present embodiment, the information input during the conference is drawn in a memory space different from the space for other pieces of information. Data 28 is drawn in a memory space 20, and objects 30, 32, 34 and 36 are drawn in a memory space 22. Display is given by overlapping (combining) memory spaces 20 and 22 with their coordinates aligned.

Here, assume that the user wishes to print objects 30 and 32 and not to print other objects, of the four input objects. In the present embodiment, objects to be printed (30 and 32) are selected, and drawn in a memory space 24 shown in FIG. 1B, which is different from memory space 22. When printing is executed, a combination of memory space 20 including the data 28 shown in FIG. 1A and memory space 24, with the coordinates aligned, is printed. Therefore, printing of unnecessary pieces of information among the input pieces of information can be avoided.

—Configuration—
<Appearance>

Referring to FIG. 2, an information display apparatus 52 in accordance with the present embodiment is a large information display apparatus used, for example, for a conference. Information display apparatus 52 displays contents of proceedings of the conference in a display area, which will be described later, in accordance with a user instruction by a touch pen 54 or the like used by an organizer or the like of the conference, and allows printing of the contents of proceedings.

Information display apparatus 52 includes: a stand 58; a large LCD (Liquid Crystal Display) 60 mounted on an upper surface of stand 58 and having a rectangular shape long in the widthwise direction; a transparent touch panel 62, having the same shape as large LCD 60 and provided integrated with the front surface of large LCD 60; a scanner 64 placed below large LCD 60 and transparent touch panel 62, and having a pair of openings 64A and 64B arranged in the vertical direction on the front surface; and a printer 66 placed on stand 58.

Stand 58 includes a base 68 having a flat upper surface, and a pair of left and right legs 70 coupling base 68 and large LCD 60 to each other. At the bottom portion of base 68, four casters 68A are attached rotatably, for moving information display apparatus 52. Each leg 70 is a wide, thin plate member, and the legs are erected on the upper surface of base 68, spaced by a prescribed distance from each other. On the tip end surfaces of legs 70, large LCD 60 is mounted. Printer 66 is arranged between the legs 70.

Large LCD 60 has a display area for displaying the image information, formed on its front surface. The display area of large LCD 60 has a similar contour as the large LCD 60, and occupies most of the front surface of large LCD 60.

Scanner 46 is for reading a document for presentation or the like. Scanner 46 reads an image of the document fed from the upper opening 64A, and thereafter, discharges the document from the lower opening 64B. Printer 66 is for printing out the information displayed on information display apparatus 52.

<Hardware Configuration>

Figure 3:
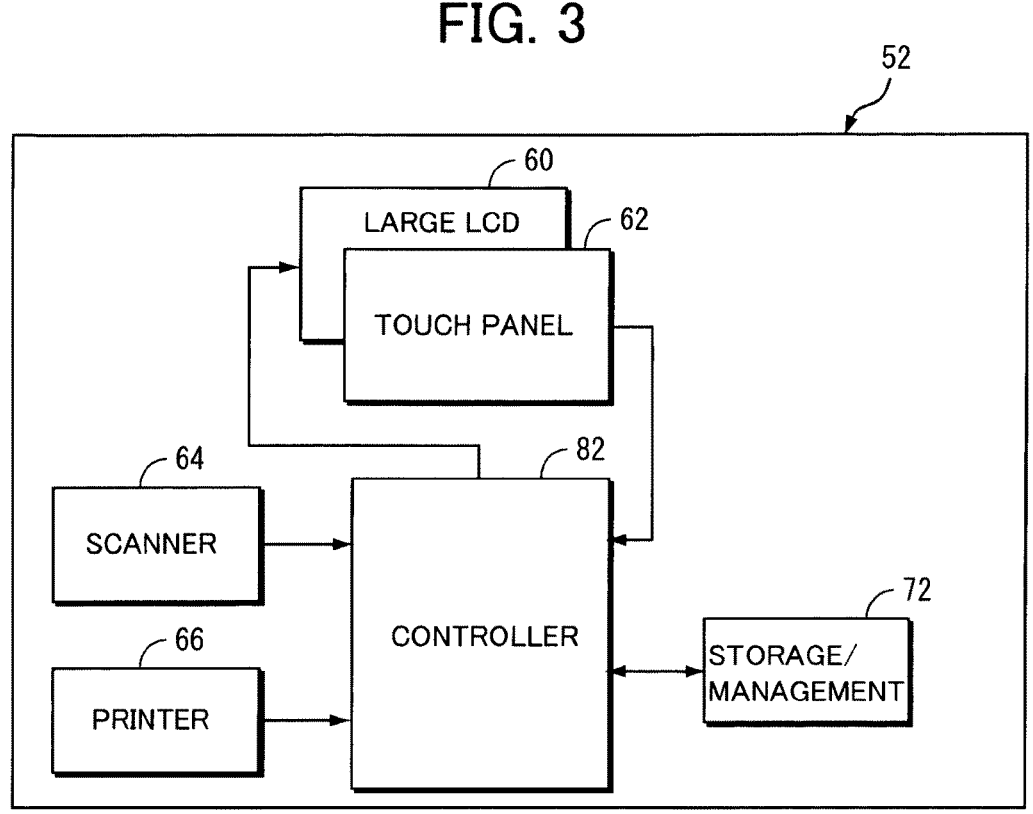
FIG. 3 is a block diagram showing hardware configuration of information display apparatus 52 in accordance with the first embodiment.

Referring to FIG. 3, information display apparatus 52 further includes: an operation key, not shown, for transmitting a user instruction to a controller, which will be described later; a controller 82 connected to large LCD 60, transparent touch panel 62, scanner 64 and printer 66, respectively, by a USB (Universal Serial Bus) I/F (interface), and controlling these components in accordance with a prescribed program, for attaining the function of displaying and printing information selected by the user, among the pieces of information input to information display apparatus 52 and attaining general functions of the information display apparatus; and a storage/management unit 72 connected to controller 82, for storing and managing information to be displayed on the display area of large LCD 60, information input through transparent touch panel 62, and a program and the like for realizing the functions of controller 82.

Controller 82 includes a CPU (Central Processing Unit), not shown, that executes the prescribed program described above and thereby realizes the functions described above.

Controller 82 further includes an ROM (Read Only Memory) and an RAM (Random Access Memory), not shown.

<Configuration of Transparent Touch Panel 62>

Figure 4:
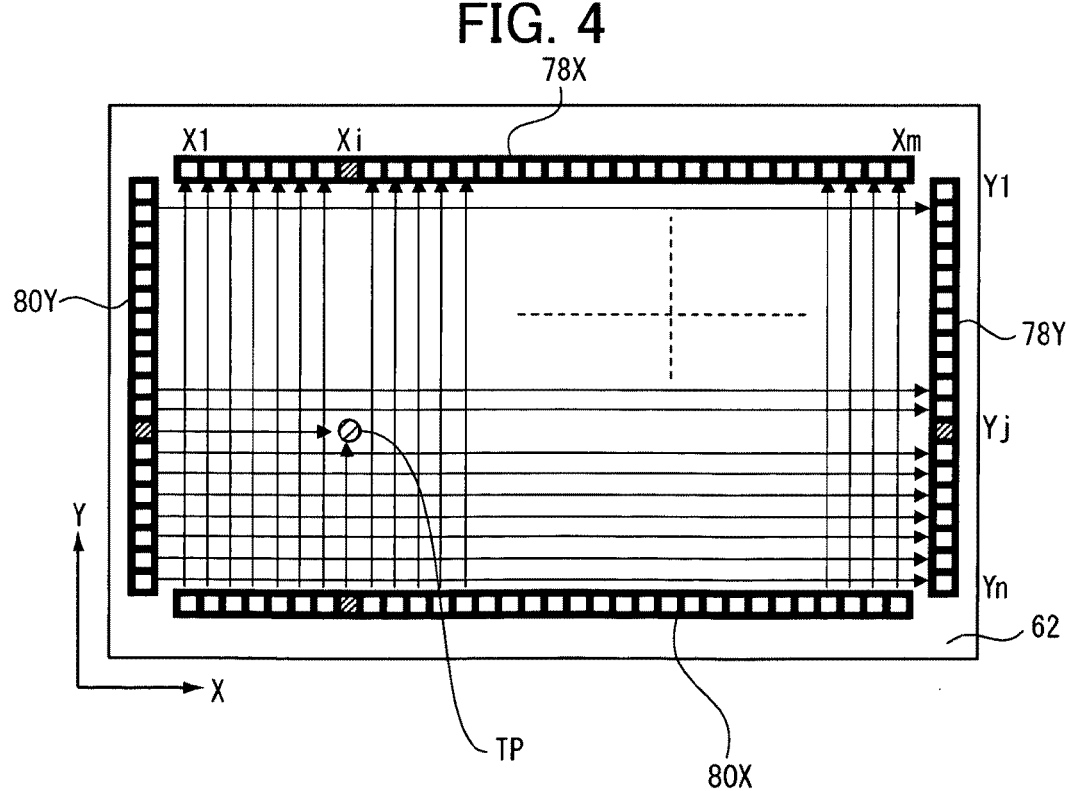
FIG. 4 is a front view schematically showing the structure of a transparent touch panel 62 shown in FIG. 3.

In FIG. 4, the direction along the longer side (widthwise direction) of transparent touch panel 62 corresponds to the X-axis direction, and the direction along the shorter side (lengthwise direction) corresponds to the Y-axis direction.

Referring to FIG. 4, in the present embodiment, a touch panel that performs optical position detection is used as transparent touch panel 62. Specifically, at an inner edge of an upper longer side (that is, upper side) of the operation surface of transparent touch panel 62, an X-axis direction photo transistor array 78X is arranged, along the upper side. At the inner edge of a lower longer side (that is, lower side), an X-axis direction LED (Light Emitting Diode) array 80X is arranged, along the lower side. Thus, an optical axis along the X-axis direction is formed by each photo transistor of X-direction photo transistor array 78X and each LED of X-direction LED array 80X, opposed to each other. Further, at an inner edge of a right, shorter side (that is, right side) of the operation surface of transparent touch panel 62, a Y-direction photo transistor array 78Y is arranged along the right side. At an inner edge of a left, short side (that is, left side), a Y-direction LED array 80Y is arranged. Thus, an optical axis along the Y-axis direction is formed between each photo transistor of Y-direction photo transistor array 78Y and each LED of Y-direction LED array 80, opposed to each other. In the photo transistor arrays 78X and 78Y, m and n photo transistors are mounted on a substrate thereof, respectively. Similarly, in LED arrays 80X and 80Y, m and n LEDs are mounted on a substrate thereof, respectively. Therefore, on the operation surface mentioned above, m×n intersections of optical axes result.

When a touch pen 54 of an organizer of the conference or the like touches the transparent member (operating surface) of transparent touch panel 62 having the above-described configuration, light beams of LEDs of LED arrays 80X and 80Y along the X-axis and Y-axis directions passing through the touched position TP are interrupted by touch pen 54. Therefore, light beams do not reach photo transistors of each of photo transistor arrays 78X and 78Y in the X-axis and Y-axis directions, opposed to these LEDs. A combination of coordinates of these photo transistors is output as a designated coordinate position, to controller 82 shown in FIG. 3. In the example shown in FIG. 4, the coordinate position $(X_i, Y_j)$ corresponds to the position (pen touch position) TP touched by touch pen 54.

The coordinate input to the operating surface of transparent touch panel 62 by touch pen 54 is detected by controller 82. Controller 82 displays a prescribed object at the position corresponding to the coordinates input by touch pen 54, in the display area of large LCD 60. Here, the "object" is, for example, a point image. When the organizer of the conference or the like traces the surface (operating surface) of the transparent member of transparent touch panel 62 with touch pen 54, controller 82 continuously displays objects of point images on the display area of large LCD 60, so that a figure or character as desired by the organizer and the like is drawn. Other objects may include predetermined template figures such as a line, a circle, a triangle or a rectangle.

Touch pen 54 is also operated by the user for selecting a command or the like, which will be described later, displayed on large LCD 60. When the user touches an area displaying the command once, the command can be selected.

In the following, for description, the display area and the operating surface of transparent touch panel 62 will be collectively referred to as a "display screen."

<Setting and Memory Space Configuration Related to Input Object>

Referring to FIG. 5, object management table 120 includes 0 or 1 or more entries formed and added by controller 82 every time an object is input. Each entry includes: a drawing column designating whether the object is to be displayed or not on the display screen of information display apparatus 52; a write-in order column indicating what number the input of object started, from the start of formation of object management table 120; a color column designating object color; a write-in time column indicating the time when input of the object was started; a drawing start position column indicating the coordinate position at which input of the object started, on the display screen of information display apparatus 52; a print column indicating whether or not the object is to be printed; and a pointer column for designating the address in storage/management unit 72 storing the figure data of the object. Here, "Object No." represents a serial number allotted for the printing process described later.

In the drawing column, "ON" is set as the initial value. When an instruction to omit the object from the display screen is given during the conference, the setting is changed to "OFF".

The order indicated in the write-in order column is determined based on the write-in start time in write-in time column.

The drawing start position column indicates the coordinate position (X, Y) on transparent touch panel 62 described above.

In the print column, "OFF" is set as the initial value. When an object of a certain entry is selected as an object to be printed by a print command, which will be described later, the setting of the corresponding print column is changed to "ON". The print column stores a print flag that controls enabling/disabling of object printing.

Referring to FIG. 6, storage/management unit 72 includes: an object storage 140 for storing object management table 120 shown in FIG. 5; an application drawing space 142 for storing drawing image prepared by application software such as spread sheet software, word processing software and presentation software, as a drawing data source different from the input object; a pen drawing space 144 for display, for temporarily storing an image of an object to be displayed on the display screen of information display apparatus 52 among the objects stored in object management table 120; and a pen drawing space 146 for printing, for temporarily storing an image of an object selected by the user to be printed, among the objects stored in object management table 120.

Storage/management unit 72 further includes: a display memory 148 for temporarily storing a combination of drawing images of application drawing space 142 and pen drawing space 144 for display; and a print memory 150 for temporarily storing a combination of drawing images of application drawing space 142 and pen drawing space 146 for printing.

Referring to FIG. 7, pen software commands 170 in accordance with the present embodiment includes "color selection", "erase", "undo", "drawing mode", "hand-writing mode" and "print."

The color selection command is for determining the object color, and the color selected before drawing the object is effective. Further, when the user touches an input coordinate position of an already written object with touch pen 54 to select the object and selects a different color by the color selection command, the color of the object is changed to the selected color.

The erase command is for erasing part of or all of the objects from the display screen. The undo command clears the operation performed immediately before this command is selected. When the drawing mode command is selected, commands for providing template figures such as the point, line and triangle mentioned above are displayed. The hand-writing mode command is used for realizing a hand-written object, by bringing touch pen 54 into contact with the display screen and using it as a common pen. The print command displays commands for printing the selected object, in accordance with a method that will be described later.

Referring to FIG. 8, sub-commands 180 of the print command in accordance with the present embodiment includes: a print execution command for executing a process of printing an object, selected by other sub-command, which will be described later, combined with other data; a print color designation command for selecting an object to be printed, by receiving a designation of object color; a time designation command receiving selection of a certain time zone during the conference, for selecting an object of which input started in the time zone; a display area designation command for selecting an object included in an area designated by the user using touch pen 54 or the like, on the display screen of information display apparatus 52; and an order designation command for selecting an object corresponding to a designated order, based on the write-in order of each object set in object management table 120 shown in FIG. 5. Sub-commands 180 correspond to the columns of object management table 120 shown in FIG. 5, respectively.

Figure 9A:
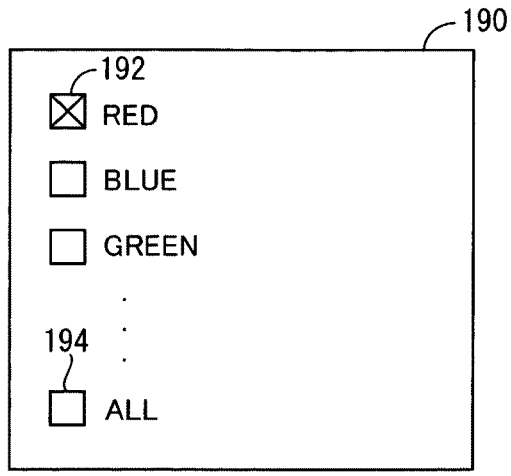
FIGS. 9A to 9C show menu images 190, 200 and 210 that correspond to respective sub-commands shown in FIG. 8.

Referring to FIG. 9A, when the "print color designation" command is selected, a print color designation menu image 190 is displayed. The print color designation menu image 190 includes check boxes 192 and the like for selecting objects of the corresponding colors, and a check box 194 for designating all colors. Here, check box 192 is selected by the user, and "red" is selected.

Figure 9B:
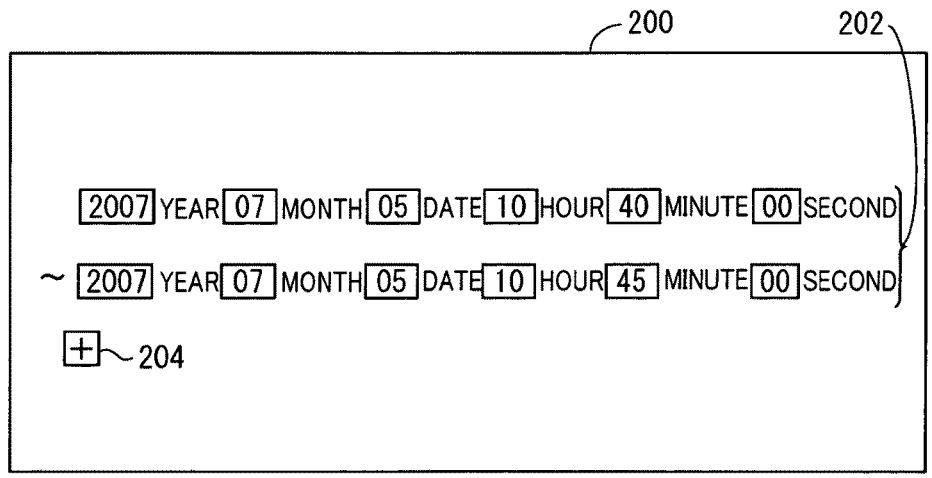

Referring to FIG. 9B, when the "time designation" command is selected, a time designation menu image 200 is displayed. Time designation menu image 200 includes: boxes 202 receiving inputs of start time and end time of a time zone to be designated; and a plus button 204 for providing, when clicked, boxes similar to boxes 202 for designating a time zone different from that designated by boxes 202. When plus button 204 is clicked, another plus button is also displayed, allowing designation of a further time zone. Here, by boxes 202, the time zone of write-in from Jul. 5, 2007, 10:40:00 to 10:45:00 is designated.

Figure 9C:
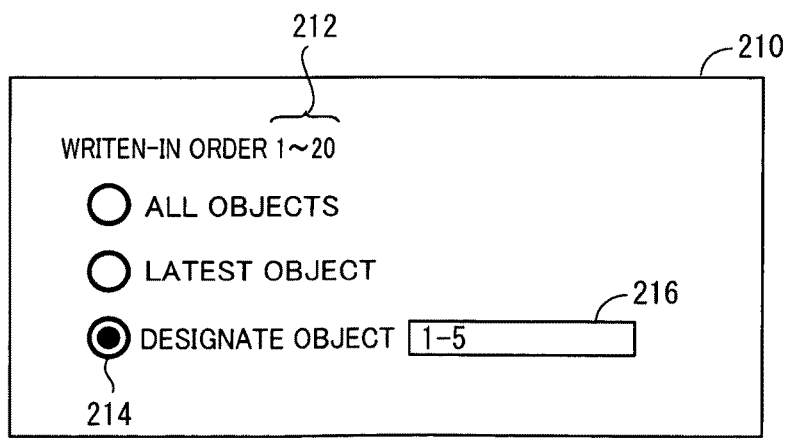

Referring to FIG. 9C, when the "order designation" command is selected, an order designation menu image 210 is displayed. Order designation menu image 210 includes: a display 212 indicating the range of write-in order of objects that are printable at present; buttons 214 and the like for fixing one of three choices of "all objects", "latest object" and "designate object"; and a box 216 for inputting the order, when "designate object" is selected. Here, write-in orders of 1 to 5 are designated by button 214 and box 216.

<Program Structure>

In the following, an object selective printing program, executed by controller 82 shown in FIG. 2 will be described. The program is activated, after the power of information display apparatus 52 is turned on, when the print command of pen software command 170 shown in FIG. 7 is selected.

Figure 10:
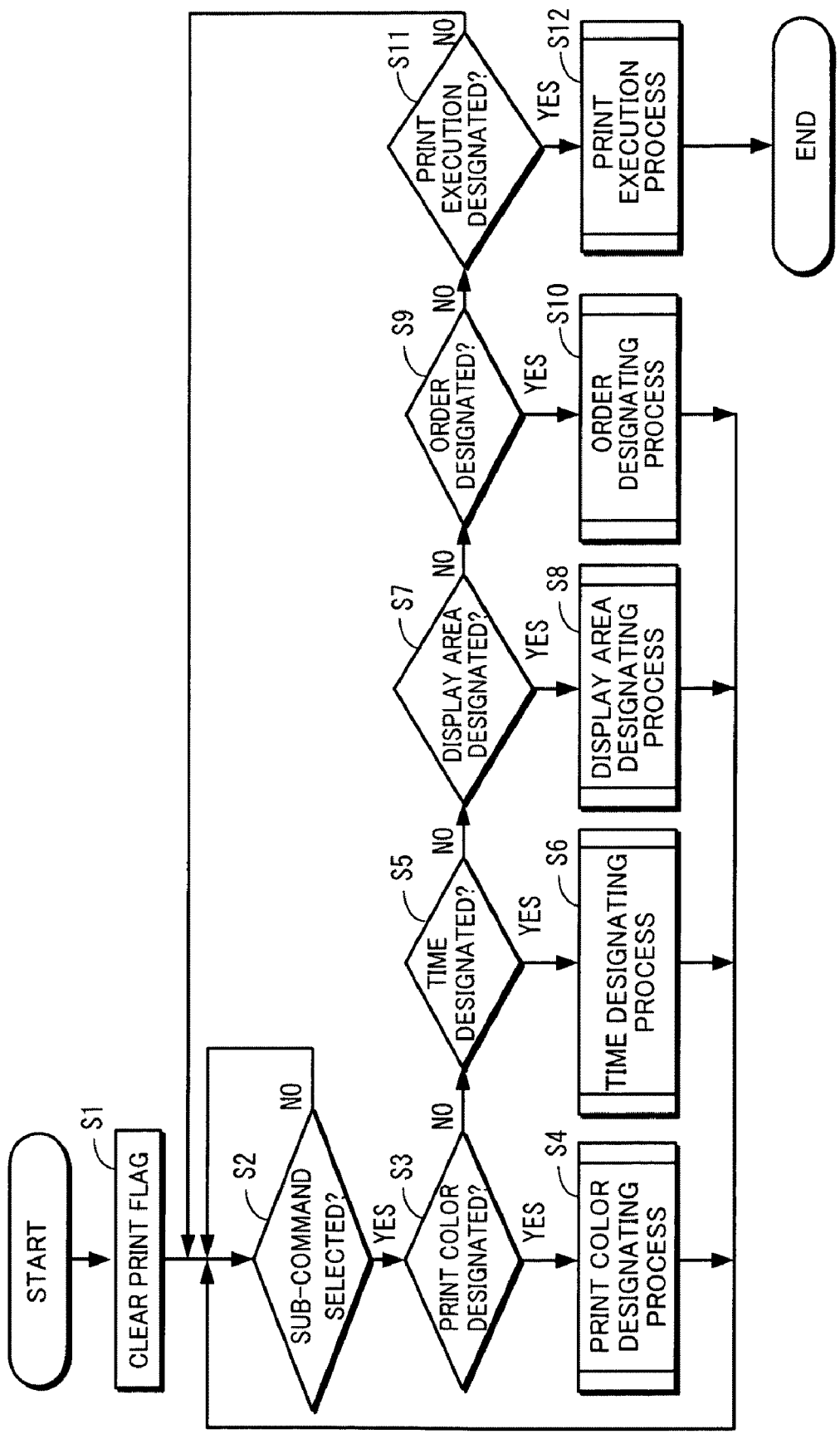
FIG. 10 is a flowchart showing a main control program for object selective printing, in accordance with the first embodiment of the present invention, executed by controller 82 shown in FIG. 2.

Referring to FIG. 10, the program includes: a step (hereinafter denoted as "S") 1 of clearing (OFF) print flags of all objects stored in object management table 120 shown in FIG. 5; S2 executed following S1, of waiting until any of the sub-commands 180 of print command shown in FIG. 8 is selected; S3 executed in response to a determination at S2 that any of the sub-commands 180 is selected, of determining whether or not the selected sub-command is a print color designation command, and branching the control flow in accordance with the result of determination; and S4 executed in response to a determination at S3 that it is a print color designation, of performing a process for designating the print color.

The program further includes: S5 and S6 executed in response to a determination at S3 that it is not a print color designation, of performing a process similar to S3 and S4, respectively, in relation to time designation; S7 and S8 executed in response to a determination at S5 that it is not a time designation, of performing a process similar to S3 and S4, respectively, in relation to display area designation; and S9 and S10 executed in response to a determination at S7 that the sub-command is not for display area designation, of performing a process similar to S3 and S4, respectively, in relation to order designation. After S4, S6, S8 or S10, the process returns to S2.

The program further includes: S11 executed in response to a determination at S9 that the selected sub-command is not for order designation, of determining whether or not the selected sub-command is a print execution command, and if not, returning the process to S2; and S12 executed in response to a determination at S11 that the selected sub-command is a print execution command, of activating a print execution process, which will be described later, and terminating the process. Though not shown, the program ends if a cancel key is pressed.

The programs shown in FIGS. 11 to 14 determine whether the print flag is to be turned ON or not, in accordance with the contents of user instruction with print color designation, time designation, display area designation and order designation, respectively.

Figure 11:
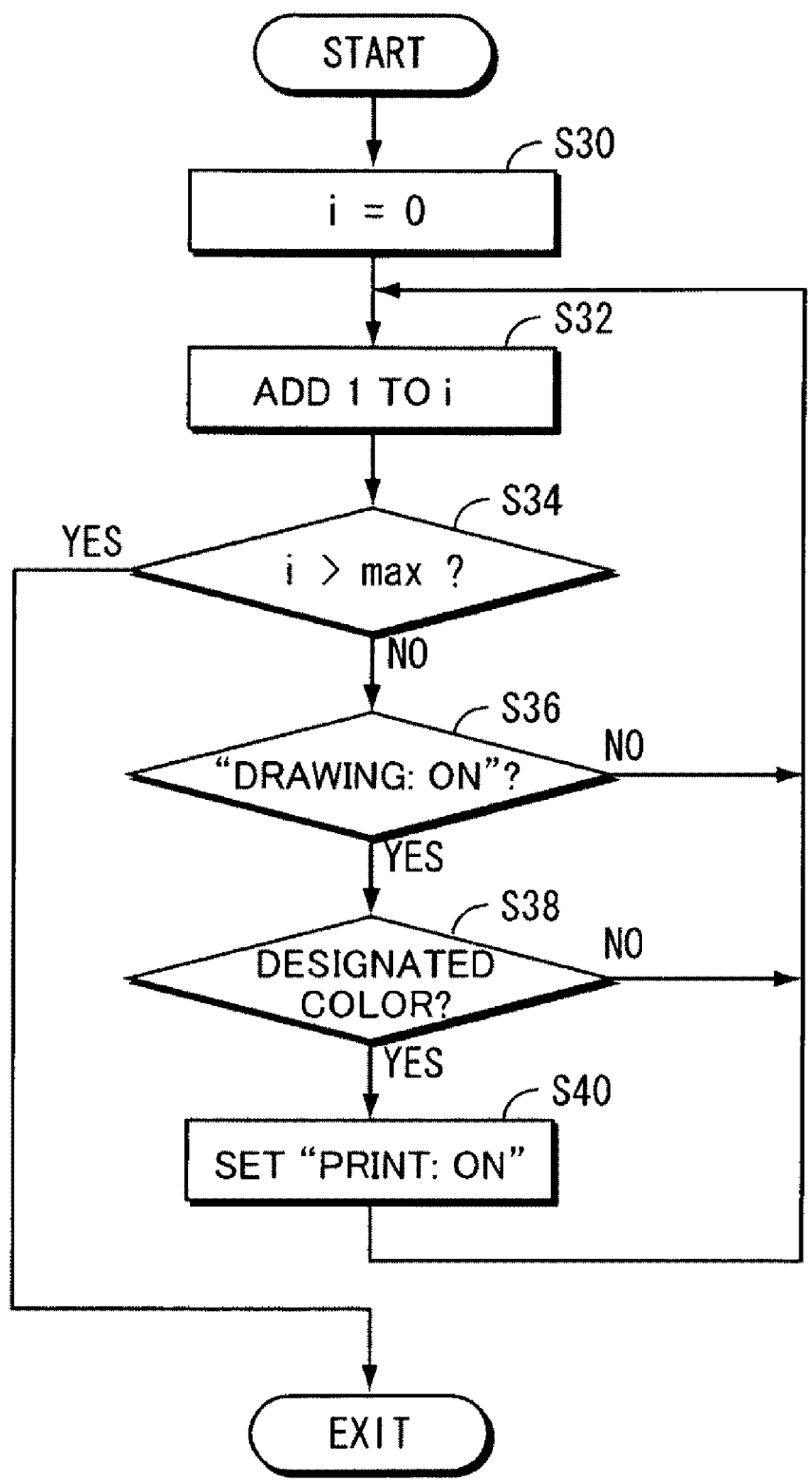
FIG. 11 is a flowchart of the program activated at S4 of FIG. 10.

Referring to FIG. 11, the program includes: S30 of inputting 0 to a variable i indicating a row number of object management table 120; S32 executed following S30, of adding 1 to variable i; S34 executed following S32, of determining whether the value of variable i is larger than the number of rows (max) input in object management table 120, and branching the control flow in accordance with the result of determination; S36 executed in response to a determination at S34 that i>max is not satisfied, of reading information of an object stored in the row indicated by the variable i of object management table 120, determining whether the value of drawing column is ON or not, and branching the control flow dependent on the result of determination; S38 executed in response to a determination at S36 that the value of drawing column is ON, of determining whether the color designated by the value of color column of the object is the same as the color designated by the print color designation, and branching the control flow in accordance with the result of determination; and S40 executed in response to a determination at S38 that the object color is the same as the print color, of setting ON the print flag of the object. If the result of determination at S36 or S38 is NO, or after S40, the process returns to S32. If the result of determination at S34 is YES, the process returns to S2 of FIG. 10.

Figure 12:
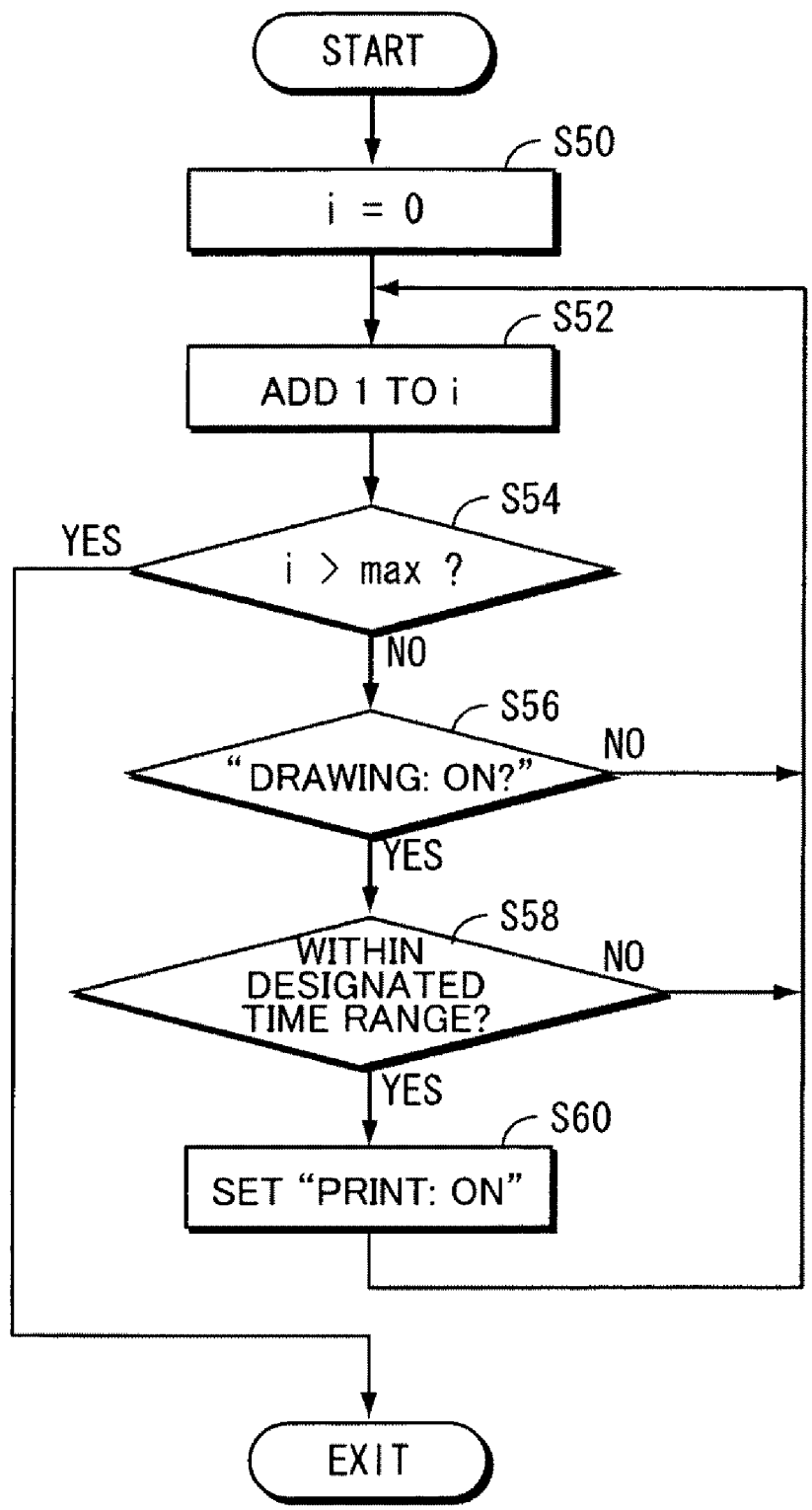
FIG. 12 is a flowchart of the program activated at S6 of FIG. 10.

Referring to FIG. 12, the program has a control structure similar to the program of which control structure is shown in FIG. 11, and includes S50, S52, S54, S56 and S60 at which processes similar to S30, S32, S34, S36 and S40, respectively, shown in FIG. 11 are performed. Different from S38 of FIG. 11, however, at S58 of the present program, whether the value of the write-in time of the object is within the prescribed time range or not is determined, and if the result of determination is YES, the control flow is branched to S60, and if it is NO, to S52.

Figure 13:
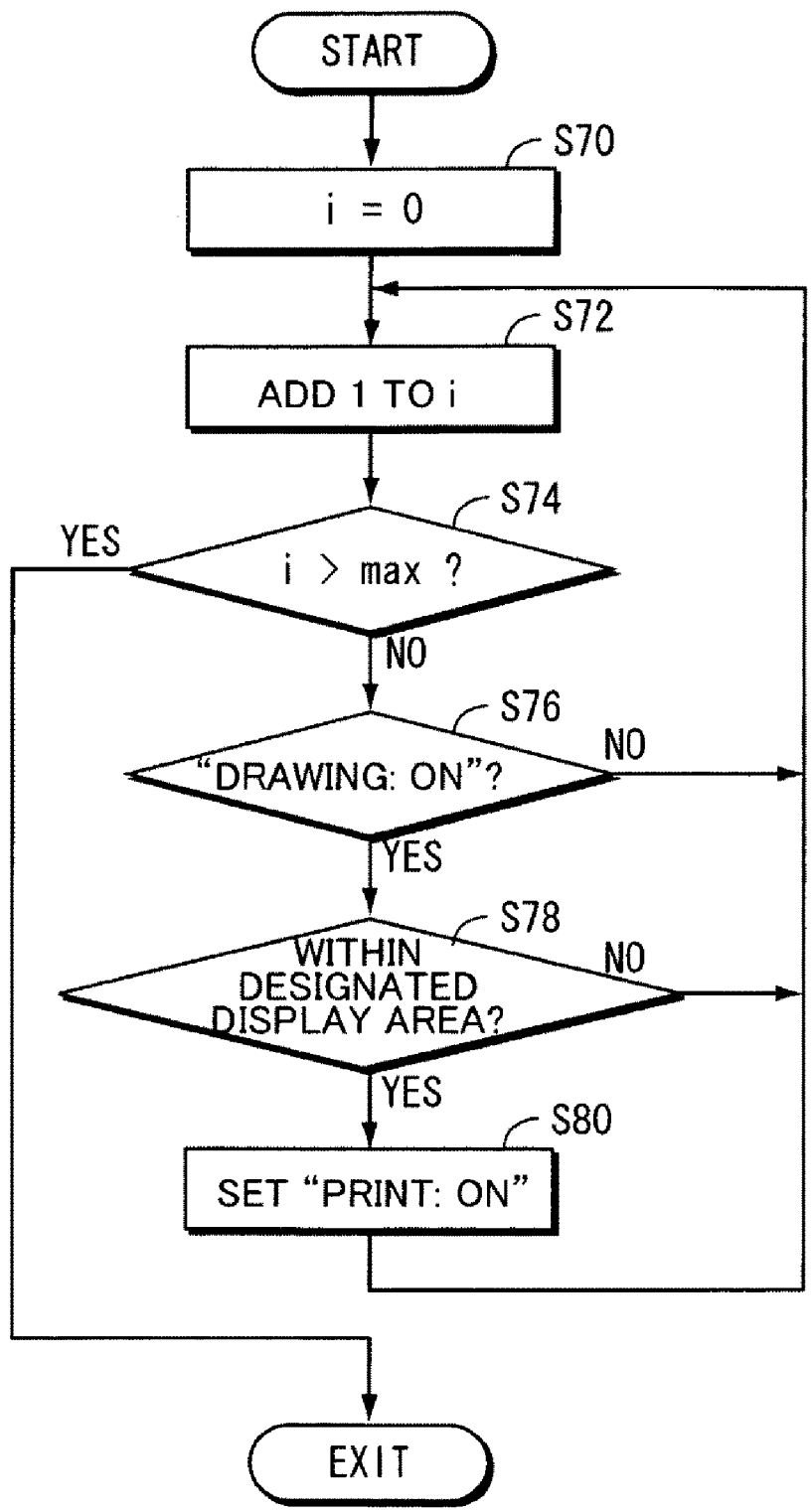
FIG. 13 is a flowchart of the program activated at S8 of FIG. 10.

Referring to FIG. 13, the program has a control structure similar to the program of which control structure is shown in FIG. 11, and includes S70, S72, S74, S76 and S80 at which processes similar to S30, S32, S34, S36 and S40 shown in FIG. 11 are performed. Different from S38 of FIG. 11, however, at S78 of the present program, whether the value of write-in start position column of the object is within the prescribed display area or not is determined, and if the result of determination is YES, the control flow is branched to S80, and if not, to S72.

Figure 14:
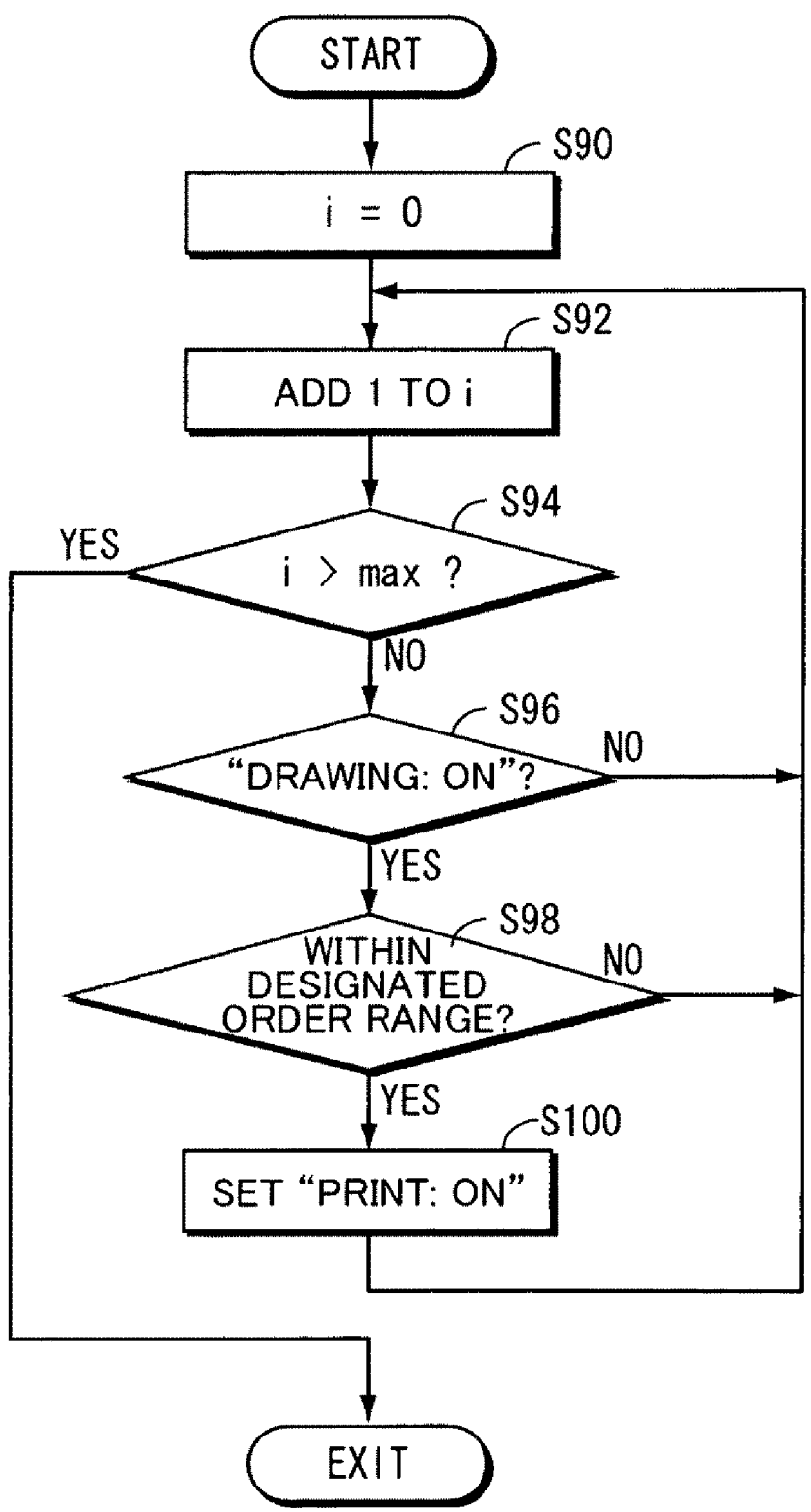
FIG. 14 is a flowchart of the program activated at S10 of FIG. 10.

Referring to FIG. 14, the program has a control structure similar to the program of which control structure is shown in FIG. 11, and includes S90, S92, S94, S96 and S100 at which processes similar to S30, S32, S34, S36 and S40 shown in FIG. 11 are performed. Different from S38 of FIG. 11, however, at S98 of the present program, whether the value of write-in order column of the object is within a range of a prescribed order or not is determined, and if the result of determination is YES, the control flow is branched to S100, and if not, to S92.

Figure 15:
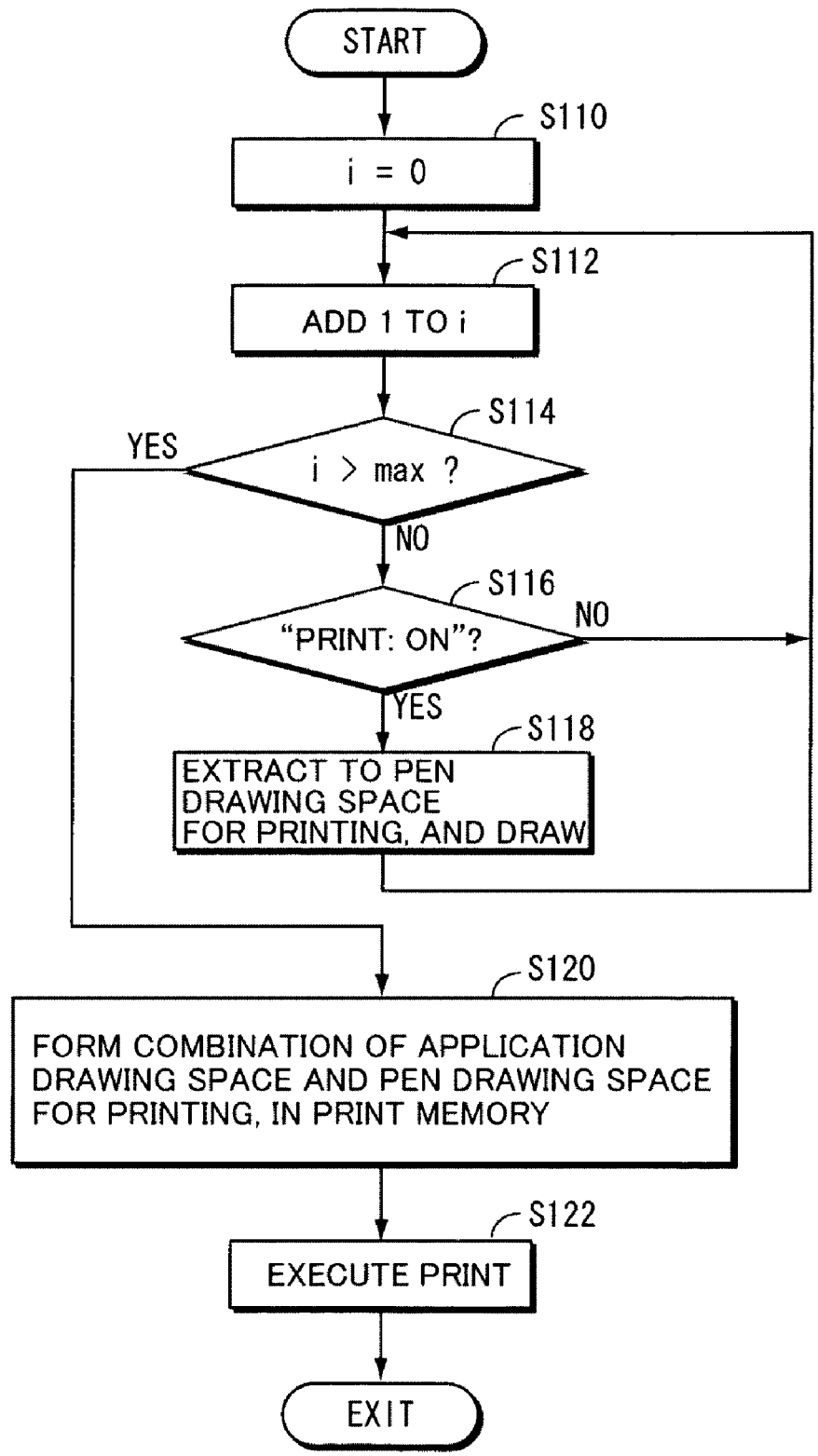
FIG. 15 is a flowchart of the program activated at S12 of FIG. 10.

Referring to FIG. 15, the program has a control structure similar to the program of which control structure is shown in FIG. 11, and includes S110, S112 and S114 at which processes similar to S30, S32 and S34 shown in FIG. 11 are performed, and it further includes: S116 executed in response to a determination at S114 that i>max is not satisfied, of determining whether the print column of the object of the row indicated by the variable i in object management table 120 is ON, and if the result of determination is NO, returning the process to S112; S118 executed in response to a determination at S116 that the print column is ON, of extracting the information represented by the corresponding row of object management table 120, based on the information, drawing the object on the pen drawing space 146 for printing shown in FIG. 6, and returning the process to S112; S120 executed in response to the determination at S114 that i>max is satisfied, of forming a combination of application drawing space 142 and pen drawing space 146 for printing, in print memory 150; and S122 executed following S120, of printing the data formed at S120, and thereafter terminating the process.

—Operation—

Information display apparatus 52, of which structure has been described above, operates in the following manner. In the following, it is assumed for convenience of description, that the main powers of all components related to information display apparatus 52 are constantly kept on.

When a conference starts, controller 82 displays data stored in application drawing space 142 of storage/management unit 72 shown in FIG. 6 and pen software commands 170 shown in FIG. 7, on the display screen, in accordance with a user instruction. Transparent touch panel 62 receives an input of an object by the user using touch pen 54. When an object is input, controller 82 starts formation of object management table 120 shown in FIG. 5.

Controller 82 sets, in object management table 120, the value of write-in order column of the row including the information related to the first input object to 1, and thereafter, sets the value of write-in order column in the order of input. In the color selection column of the row, a value indicating the color determined by the color selection command of pen software commands 170 is set. In the write-in time column and the drawing start position column of the row, the time at which the input of object started, and the input coordinate position of transparent touch panel 62 are set, respectively. As the initial values, the drawing column is set to ON, and the print column is set to OFF.

Controller 82 performs the following process at a prescribed time interval. Referring to FIG. 6, a display image prepared by general application software is drawn in application drawing space 142. Thereafter, from all the objects stored in object management table 120 in object storage 140, an object or objects of which value of drawing column is ON are extracted, and the display image of these objects are drawn in pen drawing space 144 for display. Next, on the image drawn in application drawing space 142, an image drawn in pen drawing space 144 for display is overlapped, whereby a final display image is formed in display memory 148. Large LCD 60 reads and displays the contents of display memory 148 at the prescribed time interval.

Therefore, when an object is added to object storage 140, the display image of the object is displayed in pen drawing space 144 for display at the next refresh timing, stored in the display memory 148, and finally, added to the display on large LCD 60. On the contrary, when the value of drawing column of an object in object management table 120 in object storage 140 attains to OFF, the display image of the object is no longer drawn in the pen drawing space 144 for display at the next refresh timing, and finally, the display image of the object is omitted from large LCD 60.

When the user selects the print command from the pen software commands 170 shown in FIG. 7, the program shown in FIG. 10 is activated. At S1, controller 82 sets the values of print column to OFF, for all the objects in object management table 120.

Thereafter, controller 82 receives selection of sub-commands 180 of the print command shown in FIG. 8 and designation of a value corresponding to each sub-command shown in FIG. 9, from the user. At S32 to S40 shown in FIG. 11, S52 to S60 shown in FIG. 12, S72 to S80 shown in FIG. 13 and S92 to S100 shown in FIG. 14, controller 82 determines whether drawing is ON and the value corresponding to a sub-command of the object is within the user-designated value or not, for each object stored in object management table 120. If the conditions are satisfied, controller 82 sets the print flag to ON. If not, controller 82 executes no operation. When an instruction to execute printing is received, controller 82 extracts all objects of which print flag is ON from object management table 120 of object storage 140 and draw image in pen drawing space 146 for printing, at S110 to S122 shown in FIG. 15. Thereafter, controller 82 combines the drawn object with other data, and prints.

More specifically, controller 82 performs the following operation. The process of S2 to S10 is repeated until the result of determination at S11 becomes YES. If there is any instruction of sub-commands 180, the result of determination at S5, S7 or S9 becomes YES. This means that a reference is set for determining whether the print flag of each object stored in object management table 120 is to be turned ON/OFF.

If the selected sub-command is the print color designation and red is selected as shown in menu image 190 of FIG. 9A, controller 82 performs the following operation, on each object. If the drawing column of object management table 120 is OFF, controller 82 does not perform any operation, and proceeds to processing of the next object. If the drawing column is ON, controller 82 turns ON the print flag of object management table 120 for the object of which color column indicates the color red, in object management table 120. If not, controller 82 does not perform any operation, and proceeds to processing of the next object.

Similar process is performed for the time designation command. At S58 shown in FIG. 12, if the value indicated by the write-in time column is within the designated time range, controller 82 turns ON the print flag of the corresponding object. Similar processes are performed in relation to the display area designation and order designation.

Thereafter, when the user command designates the print execution command of sub-commands 180, the result of determination at S11 becomes YES. At S112 to S118 of FIG. 15, controller 82 determines whether the value of print column in the object management table 120 is ON or not, for every object. If the result of determination is ON, controller 82 extracts the corresponding object from object management table 120 of object storage 140 to the pen drawing space 146 for printing. After the end of the process on every object, at S120 and S122, controller 82 draws a combination of display images stored in application drawing space 142 and pen drawing space 146 for printing, in print memory 150, and prints the same. After the execution of printing, controller 82 terminates the process.

Figure 1B:
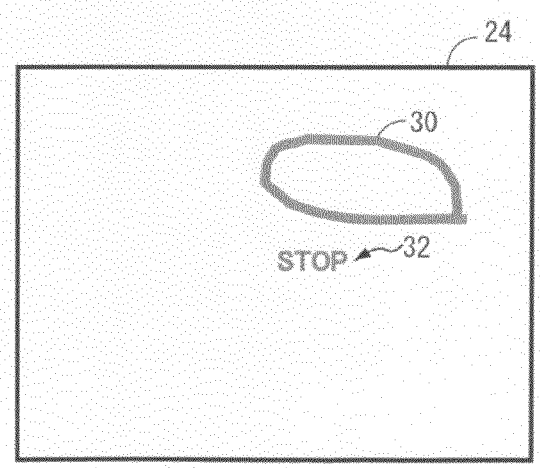

An example will be described in the following, with reference to the schematic illustrations of FIGS. 1A and 1B. Assume that in memory spaces 20, 22 and 24 shown in FIGS. 1A and 1B, objects 30, 32, 34 and 36 correspond to object Nos. 0001, 0002, 0003 and 0005 of object management table 120 shown in FIG. 5, respectively. Further, assume that memory space 20 corresponds to application drawing space 142, memory space 22 corresponds to pen drawing space 144 for display, and memory space 24 corresponds to pen drawing space 146 for printing, shown in FIG. 6. Display memory 148 stores data 28 stored in application drawing space 142, and the above-described four objects drawn in pen drawing space 144 for display. The display screen is as shown by screen 10. Here, assume that a red object is selected, by the print color designation of sub-commands 180 shown in FIG. 8. Controller 82 turns the "print" column of object Nos. 0001 and 0002 of object management table 120 from OFF to ON. Thereafter, when the print execution command of sub-commands 180 is selected by the user, objects 30 and 32 are extracted from object storage 140 to pen drawing space 146 for printing in response, and drawn. Thus, pen drawing space 146 for printing comes to be like memory space 24. Controller 82 forms combined data of application drawing space 142 and pen drawing space 146 for printing, in print memory 150, and prints the same.

As described above, according to the information display apparatus 52 of the present embodiment, it is possible to select information to be printed, from input pieces of information. In the example described above, if the user considers objects 34 and 36 are not worth printing, among the displayed objects, printing of these can be avoided by the information display apparatus 52 of the present embodiment. As the printout does not include any unnecessary data, it is possible to improve efficiency of the user's work.

[Modification]

The method of connection between controller 82 and each of large LCD 60, transparent touch panel 62, scanner 64 and printer 66 may utilize Ethernet (registered trademark), power communication, wireless LAN (Local Area Network), Bluetooth (registered trademark), UWB (Ultra Wide Band), Wi-MAX (Worldwide Interoperability for Microwave Access) or the like, rather than USB I/F.

In connection with the print color designation of sub-commands 180 shown in FIG. 8, it may be modified to allow the user to change the color of displayed object to a different color for printing. For example, an approach may be taken in which, when the user selects red on the menu image 190 of FIG. 9A, a new menu image appears and information display apparatus 52 allows the user to set in which color the red object is to be printed. By such an approach, it becomes possible to change an object of light color or fluorescent color, which is not easily viewable when printed, to a color that is easier to view.

Further, information display apparatus 52 may be adapted to allow printing of a plurality of objects displayed in different colors in a single color. Therefore, it is possible by information display apparatus 52 to meet a user's demand that a plurality of objects should be displayed in different colors during the conference but color distinction is unnecessary for printout.

As regards the print color designation, if the user does not designate any color, information display apparatus 52 may print all objects.

Further, as regards the print color designation, information display apparatus 52 may designate a color not to be printed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An information display apparatus, comprising:
   a display unit having a display screen;
   an input panel provided on the display screen;
   a first storage;
   a printer;
   a first storage controller coupled to said input panel and said first storage, for storing drawing data from a touch pen input to said input panel, together with a prescribed attribute value, in said first storage;

a display controller coupled to said display unit, said input panel and said first storage, for displaying drawing data selected from the drawing data stored in said first storage, on said display screen; and a print controller coupled to said display unit, said input panel and said printer, for extracting, from the drawing data displayed on said display screen, data of which said prescribed attribute value satisfies a prescribed condition designated by a user through an operation of said input panel, wherein said prescribed attribute value includes a coordinate position on said display screen where input of the drawing data was started by said input panel; and said print controller includes means for extracting, from the drawing data displayed on said display screen, data of which coordinate position on said display screen where input was started is within a scope of coordinate positions designated by the user by operation of said input panel, and causing said printer to print the extracted drawing data, and said information display apparatus further comprises:
a second storage; and
a second storage controller coupled to said second storage, for storing drawing data formed by drawing data source in said second storage; wherein
said print controller includes
means for extracting the drawing data displayed on said display screen, data of which said coordinate position on said display screen where input was started is within a scope of coordinate positions designated by a user through an operation of said input panel, combining the extracted data with drawing data stored in said second storage, and causing said printer to print the combined drawing data.

2. The information display apparatus according to claim 1, wherein said prescribed attribute value further includes a drawing color when the drawing data is displayed on said display screen; and said print controller further includes means for extracting, from the drawing data displayed on the display screen, data of which drawing color when displayed is the same as a color designated by a user by an operation of said control panel, and causing said printer to print the extracted drawing data.

3. The information display apparatus according to claim 1, wherein said print controller further includes means for extracting, thorn the drawing data displayed on said display screen, data of which drawing color when displayed is the same as any of an arbitrary number of colors designated by the user by an operation of said input panel, and causing said printer to print the extracted drawing data.

4. The information display apparatus according to claim 1, wherein said prescribed attribute value further includes time when input of the drawing data was started by said input panel; and said print controller further includes means for extracting, from the drawing data displayed on said display screen, data of which said input start time is within a time range designated by the user by an operation of said input panel, and cawing said printer to print the extracted drawing data.

5. The information display apparatus according to claim 1, wherein said prescribed attribute value further includes an order of input of said drawing data by said input panel; and said print controller further includes means for extracting, from the drawing data displayed on said display screen, data of which said order of input is within a range of order of input designated by the user by an operation of said input panel, and causing said printer to print the extracted drawing data.

6. An information display method, comprising:
receiving an input of drawing data from a touch pen to be displayed on a display screen;
storing the drawing data input at said step receiving together with a prescribed attribute value, in a first drawing data storage memory;
displaying, from the drawing data stored in said first data storage memory, drawing data selected by a user, on said display screen;
designating a prescribed condition related to said prescribed attribute value;
extracting and outputting, from the drawing data displayed on said display screen, data of which said prescribed attribute value satisfies the prescribed condition designated at said designating step; and
printing the drawing data output at said step of extracting, wherein
said prescribed attribute value includes a coordinate position en said display screen where input of the drawing data was started at said step of receiving; and
said step of extracting and outputting includes the step of extracting, from the drawing data displayed on said display screen, data of which coordinate position on said display screen where input was started is within a scope of coordinate positions designated by the user a said step of designating, and
said information display method further comprises:
receiving an input of drawing data formed by a drawing data source; and
storing the input drawing data formed by a drawing data source in a second data storage memory; wherein
said print controller includes means for extracting from the drawing data displayed on the display screen, data of which said coordinate position of display screen where input was started is within a scope of coordinate positions designated by a user through an operation of said input panel, combining the extract data with drawing data stored in said second data storage memory, and causing said printer to print the combined drawing data.

7. The information display method according to claim 6, wherein said prescribed attribute value further includes a drawing color of drawing data when displayed on said display screen; and said step of extracting further includes the step of extracting and outputting, from the drawing data displayed on said display screen, data of which drawing color when displayed is the same as a color designated at said step of designating.

8. A non-transitory, tangible, computer-readable recording medium encoded with an information display program causing, when executed on a computer, said computer to execute an information display method including the steps of:
receiving an input of drawing data from a touch pen to be displayed on a display screen;
storing the drawing data input at said step receiving together with a prescribed attribute value, in a first drawing data storage memory;
displaying, from the drawing data stored in said first drawing data storage memory, drawing data selected by a user, on said display screen;

designating a prescribed condition related to said prescribed attribute value;

extracting and outputting, from the drawing data displayed on said display screen, data of which said prescribed attribute value satisfies the prescribed condition designated at said designating step; and printing the drawing data output at said step of extracting, wherein said prescribed attribute value includes a coordinate position on said display screen where input of the drawing data was started at said step of receiving; and said step of extracting and outputting includes the step of extracting, from the drawing data displayed on said display screen, data of which coordinate position on said display screen where input was started is within a scope of coordinate positions designated by the user a said step of designating and the additional steps of:

receiving an input of drawing data formed by a drawing data source; and

Storing the input drawing data a drawing data source in a second data storage memory; wherein said print controller includes means for extracting from the drawing data displayed on the display screen, data of which said coordinate position of said display screen where input was started is within a scope of coordinate positions designated by a user through an operation of said input panel, combining the extracted data with drawing data stored in said second data storage memory, and causing said printer to print the combined drawing data.

9. The non-transitory, tangible, computer-readable recording medium according to claim 8, wherein said prescribed attribute value further includes a drawing color of said drawing data when displayed on said display screen; and said step of extracting and outputting further includes the step of extracting, from drawing data displayed on said display screen, data of which drawing color when displayed is the same as a color designated at said step of designating.

\* \* \* \* \*